(12) United States Patent
Parkin et al.

(10) Patent No.: US 12,277,648 B2
(45) Date of Patent: Apr. 15, 2025

(54) DUCT BLOCKAGE RISK LOCATION PREDICTION

(71) Applicant: BRITISH TELECOMMUNICATIONS PUBLIC LIMITED COMPANY, London (GB)

(72) Inventors: Neil Parkin, London (GB); Anthony Conway, London (GB)

(73) Assignee: British Telecommunications Public Limited Company, London (GB)

( * ) Notice: Subject to any disclaimer, the term of this patent is extended or adjusted under 35 U.S.C. 154(b) by 296 days.

(21) Appl. No.: 17/597,852

(22) PCT Filed: Jun. 18, 2020

(86) PCT No.: PCT/EP2020/066875
§ 371 (c)(1),
(2) Date: Jan. 26, 2022

(87) PCT Pub. No.: WO2021/018468
PCT Pub. Date: Feb. 4, 2021

(65) Prior Publication Data
US 2022/0284670 A1    Sep. 8, 2022

(30) Foreign Application Priority Data

Jul. 30, 2019   (EP) .................................. 19189025
Jul. 30, 2019   (GB) .................................. 1910831

(51) Int. Cl.
*G06T 17/05*    (2011.01)
*G06T 7/00*     (2017.01)
(52) U.S. Cl.
CPC ............ *G06T 17/05* (2013.01); *G06T 7/0004* (2013.01)

(58) Field of Classification Search
None
See application file for complete search history.

(56) References Cited

U.S. PATENT DOCUMENTS

| | | |
|---|---|---|
| 5,453,130 A | 9/1995 | Maddox |
| 7,579,962 B1 | 8/2009 | Eslambolchi et al. |

(Continued)

FOREIGN PATENT DOCUMENTS

| | | |
|---|---|---|
| CN | 104008252 A | 8/2014 |
| CN | 204059570 U | 12/2014 |

(Continued)

OTHER PUBLICATIONS

Aldosary S., et al., "A Robust Multimodal Biometric Security System using the Polynomial Curve Technique within Shamir's Secret Sharing Algorithm," Emerging Security Technologies (EST), 2012, sections 1, 2, 2.1, pp. 66-69.

(Continued)

*Primary Examiner* — James A Thompson
(74) *Attorney, Agent, or Firm* — EIP US LLP (57) ABSTRACT

The present disclosure relates to predicting blockages in underground ducts. According to one aspect, there is provided a computer-implemented method of identifying one or more locations along a route for an underground duct which indicate a blockage risk, the route extending between two ends, the method including obtaining a terrain elevation profile for the route; estimating a duct elevation profile for the route based on the terrain elevation profile; and predicting one or more blockage risk locations along the route by determining where water entering the duct from each of the two ends would settle, based on the duct elevation profile.

19 Claims, 6 Drawing Sheets

(56) References Cited

U.S. PATENT DOCUMENTS

| | | | |
|---|---|---|---|
| 9,127,948 | B2 | 9/2015 | Sandoval et al. |
| 9,684,775 | B2 | 6/2017 | Gupta et al. |
| 9,788,203 | B2 | 10/2017 | Dutt et al. |
| 10,013,509 | B2 | 7/2018 | Shuler et al. |
| 10,057,227 | B1 | 8/2018 | Hess et al. |
| 10,063,562 | B1 | 8/2018 | Molina-Markham et al. |
| 10,076,089 | B2 | 9/2018 | Chitnis et al. |
| 10,140,441 | B2 | 11/2018 | Cheng et al. |
| 2010/0115610 | A1 | 5/2010 | Tredoux et al. |
| 2010/0188216 | A1 | 7/2010 | Nielsen et al. |
| 2011/0109719 | A1* | 5/2011 | Wilson ............ G01C 11/02 348/E13.001 |
| 2013/0097416 | A1 | 4/2013 | Barra et al. |
| 2013/0103370 | A1* | 4/2013 | Barley ............ G06F 17/10 703/2 |
| 2013/0133055 | A1 | 5/2013 | Ali et al. |
| 2014/0172382 | A1* | 6/2014 | Andrews ............ F17D 5/00 703/2 |
| 2015/0112647 | A1* | 4/2015 | Currin ............ H04L 67/10 703/1 |
| 2015/0113631 | A1 | 4/2015 | Lerner et al. |
| 2015/0169858 | A1 | 6/2015 | Tg |
| 2017/0032113 | A1 | 2/2017 | Tunnell et al. |
| 2017/0109514 | A1 | 4/2017 | Cheng et al. |
| 2018/0032709 | A1 | 2/2018 | Martin Perez et al. |
| 2018/0068098 | A1 | 3/2018 | Finzi et al. |
| 2018/0077154 | A1 | 3/2018 | Smith et al. |
| 2018/0283595 | A1 | 10/2018 | Radichel et al. |
| 2020/0072624 | A1* | 3/2020 | Kuzmanovic ...... G01C 21/3461 |
| 2021/0027224 | A1* | 1/2021 | Adler ............ G06F 3/0486 |
| 2021/0371216 | A1* | 12/2021 | Fraser ............ B65G 53/30 |

FOREIGN PATENT DOCUMENTS

| | | |
|---|---|---|
| CN | 104700453 A | 6/2015 |
| CN | 109725366 A | 5/2019 |
| EP | 3970053 A1 | 3/2022 |
| FR | 3081249 A1 | 11/2019 |
| JP | H0226816 B2 | 6/1990 |
| JP | H02265816 A | 10/1990 |
| JP | 2016062113 A | 4/2016 |
| KR | 101845594 B1 | 4/2018 |
| WO | WO-2012085047 A1 | 6/2012 |
| WO | WO-2014179076 A1 | 11/2014 |
| WO | WO-2014205148 A1 | 12/2014 |

OTHER PUBLICATIONS

Antal M et al., "Identity Information Revealed From Mobile Touch Gestures," Studia Universitatis Babes-Bolyai, Informatica, May 21-25, 2014, vol. LIX, 11 pages.

Blakley G.R., "Safeguarding Cryptographic Keys", National Computer Conference 1979, pp. 313-317.

Bo C., et al., "SilentSense: Silent User Identification via Dynamics of Touch and Movement Behavioural Biometrics," in MobiCom, arXiv:1309.0073v1 [cs.CR], Aug. 31, 2013, 9 pages.

Buduru A.B., et al., "An Effective Approach to Continuous User Authentication for Touch Screen Smart Devices," 2015 IEEE International Conference on Software Quality, Reliability and Security (QRS), Vancouver, BC, 2015, pp. 219-226.

Combined Search and Examination Report under Sections 17 and 18(3) for Great Britain Application No. 1910169.0, mailed on Feb. 25, 2020, 10 pages.

Crawford H.A., "A Framework for Continuous, Transparent Authentication on Mobile Devices," PhD thesis, University of Glasgow, 2012, 209 pages.

Crouse D., et al., "Continuous Authentication of Mobile User: Fusion of Face Image and Inertial Measurement Unit Data," 2015 International Conference on Biometrics (ICB), Phuket, 2015, pp. 135-142.

Damgard I., et al., "Multiparty Computation from Somewhat Homomorphic Encryption," Advances in Cryptology—CRYPTO 2012, Proceedings of the 32nd Annual Cryptology Conference, Santa Barbara, CA, USA, Aug. 19-23, 2012, pp. 643-662.

Deutschmann I., et al., et al., "Continuous Authentication Using Behavioral Biometrics," Security DARPA, ITPro, Jul./Aug. 2013, pp. 12-15.

Examination Report under section 18(3) for GB Application No. 1910169.0, mailed on Aug. 13, 2021, 4 pages.

Extended European Search Report for Application No. 19186557.5 mailed on Nov. 7, 2019, 6 pages.

Fathy M.E., et al., "Face-Based Active Authentication on Mobile Devices," 2015 IEEE International Conference on Acoustics, Speech and Signal Processing (ICASSP), South Brisbane, QLD, 2015, pp. 1687-1691.

Feng T., et al., "Continuous Mobile Authentication using Touchscreen Gestures," Homeland Security (HST), 2012 IEEE Conference on Technologies for Homeland Security, Waltham MA, 2012, pp. 451-456.

Frank M., et al., "Touchalytics: On the Applicability of Touchscreen Input as a Behavioral Biometric for Continuous Authentication," Jan. 2013, IEEE Transactions on Information Forensics and Security, vol. 8, No. 1, XP011484631,ISSN: 1556-6013, DOI:10. 1109/ TIFS. 2012 .2225048, 13 pages.

Gong N.Z., et al., "Forgery-Resistant Touch-based Authentication on Mobile Devices," 11 ACM on Asia Conference on Computer and Communications Security, May 30-Jun. 3, 2016, 12 pages.

Howells G., "Security and Privacy for the Internet of Things (SPIRIT)", EPSRC Research Grant Details, Jan. 1, 2017, 2 pages.

International Search Report and Written Opinion for Application No. PCT/EP2020/066598, mailed on Aug. 28, 2020, 11 pages.

Lee W.H et al., "Implicit Smartphone User Authentication with Sensors and Contextual Machine Learning," Princeton University, arXiv:1708.09754v1 [cs.CR], Aug. 30, 2017, 13 pages.

Li Y., et al., "Understanding OSN-Based Facial Disclosure Against Face Authentication Systems," ASIA CCS'14, Jun. 4-6, 2014, pp. 413-423.

Li Y., et al., "Using Data Augmentation in Continuous Authentication on Smartphones," Feb. 2019, IEEE Internet of Things Journal, doi: 10.1109/JIOT.2018.2851185, vol. 6, No. 1, pp. 628-640.

Mondal S., et al., "Swipe Gesture based Continuous Authentication for Mobile Devices," 2015 International Conference on Biometrics (ICB), Jun. 2015, pp. 458-465. (9 pages).

Ometov A., et al., "Multi-factor Authentication: A Survey and Challenges in V2X Applications," 9th International Congress on Ultra Modern Telecommunications and Control Systems and Workshops, (sections I, III-B, III-C, III-D, figure 1.), Nov. 6, 2017, pp. 129-136.

Rathgeb C., et al., "A Survey on Biometric Cryptosystems and Cancelable Biometrics," EURASIP Journal on Information Security, vol. 2011, No. 1, Jan. 1, 2011, 25 pages.

Roy A., et al., "An HMM-based Multi-sensor Approach for Continuous Mobile Authentication," Military Communications Conference, MILCOM 2015, Track 3—Cyber Security and Trusted Computing, Tampa, FL, 2015, pp. 1311-1316.

Saevanee H., et al., "Continuous User Authentication using Multimodal Biometrics," Computers and Security, vol. 53, Issue C, Sep. 2015, 20 pages.

Samangouei P., et al., "Attribute-based Continuous User Authentication on Mobile Devices," 2015 IEEE 7th International Conference on Biometrics Theory, Applications and Systems (BTAS), Arlington, VA, 2015, 8 pages.

Serwadda A., et al., "When Kids' Toys Breach Mobile Phone Security," 2013 ACM SIGSAC Conference on Computer and Communications Security (CCS), Nov. 4-8, 2013, pp. 559-610.

Serwadda A., et al., "Which Verifiers Work?: A Benchmark Evaluation of Touch-based Authentication Algorithms," IEEE Sixth International Conference on Biometrics: Theory, Applications and Systems (BTAS), ser. BTAS'13, Sep. 2013, 8 pages.

Shamir A., "How to Share a Secret," Communications of the ACM, Nov. 1979, vol. 22, No. 11, pp. 612-613.

Shi W., et al., "SenGuard: Passive User Identification on Smartphones Using Multiple Sensors," 2011 IEEE 7th International Conference on Wireless and Mobile Computing, Networking and Communications (WiMob), Oct. 2011, pp. 141-148 (9pages).

(56) References Cited

OTHER PUBLICATIONS

Velten M., et al., "User Identity Verification Based on Touchscreen Interaction Analysis in Web Contexts," 11th International Conference on Information Security Practice and Experience, 2015, pp. 268-282.
Wu J S., et al., "Smartphone Continuous Authentication based on Keystroke and Gesture Profiling," The 49th Annual IEEE International Carnahan Conference on Security Technology, Sep. 21-24, 2015, pp. 191-197.
Xu H., et al., "Towards Continuous and Passive Authentication via Touch Biometrics: An Experimental Study on Smartphones," Tenth Symposium On Usable Privacy and Security, Jul. 9-11, 2014, pp. 187-198.
Yampolskiy R., et al., "Behavioural Biometrics: a Survey and Classification," International Journal of Biometrics, vol. 1, No. 1, 2008, pp. 81-113 (34 pages).
Zhang H., et al., "Robust Multimodal Recognition via Multitask Multivariate Low-Rank Representations," IEEE International Conference on Automatic Face and Gesture Recognition, 2015, 8 pages.
Zhang H., et al., "Touch Gesture-Based Active User Authentication Using Dictionaries," 2015 IEEE Winter Conference on Applications of Computer Vision, Waikoloa, HI, 2015, pp. 207-214.
Combined Search and Examination Report received for Great Britan Patent Application No. 1910831.5, mailed on Jan. 29, 2020, 5 pages.
Combined Search and Examination Report received for Great Britan Patent Application No. 2315870.2, mailed on Nov. 7, 2023, 3 pages.
"Database WPI Week 201560", Thomson Scientific, London, GB, AN 2015-497265, XP002796827, Jun. 10, 2015, 1 page.
European Extended Search Report received for European Patent Application No. 19189025.0, mailed on Feb. 10, 2020, 9 pages.
Great Britain's Notice of Allowance received for Great British Patent Application No. 1910831.5, mailed on Apr. 14, 2023.
International Preliminary Report on Patentability for Application No. PCT/EP2020/066875, mailed on Feb. 10, 2022, 11 pages.
International Search Report and Written Opinion received for PCT Patent Application No. PCT/EP2020/066875, mailed on Sep. 25, 2020, 14 pages.
Office Action received for European Patent Application No. 20732619.0, mailed on Mar. 10, 2023, 9 pages.
Office Action received for Great Britan Patent Application No. 1910831.5 mailed on Jul. 4, 2023, 4 pages.
Search Report received for Great Britain Patent Application No. 2315865.2, mailed on Nov. 7, 2023, 5 pages.
Database Compendex, "Database Accession No. E20103313165087", Database Compendex, XP002796828, Jul. 2010, 1 page.
Rodriguez, et al., "A Database and Model to Support Proactive Management of Sediment-Related Sewer Blockages", Water Research, vol. 46, No. 15, Oct. 1, 2012, pp. 4571-4586.
Schellart, et al., "Estimation of Uncertainty in Long-Term Sewer Sediment Predictions Using a Response Database", Journal of Hydraulic Engineering, vol. 136, No. 7, Jul. 2010, pp. 403-411.
Examination Report and Notification to Grant for GB2315865.2, Dated Feb. 2, 2024, 2 pgs.
"Office Action received for European Patent Application No. 20732619.0, mailed on Sep. 26, 2024", 8 pages.

* cited by examiner

DUCT BLOCKAGE RISK LOCATION PREDICTION

PRIORITY CLAIM

The present disclosure is a National Phase entry of PCT Application No PCT/EP2020/066875, filed Jun. 18, 2020, which claims priority from EP Application No. 19189025.0 filed Jul. 30, 2019 and GB Application No. 1910831.5 filed Jul. 30, 2019, each of which is hereby fully incorporated herein by reference.

FIELD

The present disclosure relates to predicting blockages in underground ducts. More specifically, aspects relate to computer-implemented methods of identifying one or more locations along a route for an underground duct which indicate a blockage risk. Further aspects relate to a data processing apparatus comprising a processor configured to perform such methods, a computer-readable storage medium having stored thereon a computer program comprising instructions which, when the program is executed by a computer, cause the computer to carry out such methods and a data carrier signal carrying such a computer program.

BACKGROUND

Underground ducts are used to convey various kinds of cables, including electric power transmission cables and telecommunication cables such as copper and fiber optic voice and/or data lines. It is important for there to be sufficient space in such ducts for cables to be drawn through them without becoming stuck, so that additional cables can be added and/or existing cables can be removed or replaced. It is sometimes discovered that a duct has become blocked, for example when attempting to draw a cable through it for one of these operations.

Techniques exist for detecting duct blockages, including "rodding" (pushing a rod through the duct to manually find and clear blockages) and ground-penetrating radar. However, such techniques involve expensive and time-consuming interventions and can only be used to detect existing blockages.

What is needed is a fast, non-invasive way to predict duct locations which indicate a blockage risk.

SUMMARY

According to a first aspect, there is provided a computer-implemented method of identifying one or more locations along a route for an underground duct which indicate a blockage risk, the route extending between two ends, the method comprising: obtaining a terrain elevation profile for the route; estimating a duct elevation profile for the route based on the terrain elevation profile; and predicting one or more blockage risk locations along the route by determining where water entering the duct from each of the two ends would settle, based on the duct elevation profile, by: splitting the duct elevation profile into a plurality of duct portions, wherein for each duct portion the duct elevation profile's gradient over the entire duct portion is one of positive, negative or flat; and predicting a blockage risk location in a first duct portion when at least one of the following conditions i) to iii) is determined to be true for that first duct portion: (i) the first duct portion extends between one of the two ends of the route and a second duct portion, the duct elevation profile being lower over at least a part of the first duct portion than over at least a part of the second duct portion, (ii) the first duct portion is a side of a two-sided well consisting of the first duct portion and a second duct portion extending from a lowest point of the first duct portion and having a gradient of opposite sign to the first duct portion, and (iii) the first duct portion is a side of a three-sided well consisting of a flat duct portion extending between lower ends of a duct portion having a negative gradient and a duct portion having a positive gradient; the method further comprising: generating an overlay for a map of the route, the overlay comprising an indication of each blockage risk location, then causing a display device to display the overlay on the map of the route; and/or in response to predicting the one or more blockage risk locations, causing a user output device to raise a user alert.

According to a second aspect, there is provided a computer-implemented method of identifying one or more locations along a route for an underground duct which indicate a blockage risk, the route extending between two ends, the method comprising: obtaining a terrain elevation profile for the route; estimating a duct elevation profile for the route based on the terrain elevation profile; and predicting one or more blockage risk locations along the route by determining where water entering the duct from each of the two ends would settle, based on the duct elevation profile.

The predicting can comprise identifying a lowest point in the duct elevation profile and predicting a blockage risk location within a portion of the route comprising lowest point.

The predicting can comprise identifying a depression in the duct elevation profile and predicting a blockage risk location within a portion of the route comprising the depression.

The predicting can comprise: estimating a first derivative of the duct elevation profile; estimating a second derivative of a point on the duct elevation profile having an estimated first derivative of zero; and identifying the depression at said point when the estimated second derivative is positive.

The predicting can comprise splitting the duct elevation profile into a plurality of duct portions, wherein for each duct portion the duct elevation profile's gradient over the entire duct portion is one of positive, negative or flat.

The predicting can further comprise predicting a blockage risk location in a first duct portion when at least one of the following conditions i) to iv) is determined to be true for that first duct portion: the first duct portion extends between one of the two ends of the route and a second duct portion, the duct elevation profile being lower over at least a part of the first duct portion than over at least a part of the second duct portion, the first duct portion is a side of a two-sided well consisting of the first duct portion and a second duct portion extending from a lowest point of the first duct portion and having a gradient of opposite sign to the first duct portion, and the first duct portion is a side of a three-sided well consisting of a flat duct portion extending between lower ends of a duct portion having a negative gradient and a duct portion having a positive gradient, and the first duct portion is comprised in a well consisting of a concatenated series of duct portions starting with a proximal duct portion and ending with a distal duct portion, over which the duct elevation profile always remains lower than the lower of: (a) its highest value for the proximal duct portion, and (b) its highest value for the distal duct portion.

The estimating can comprise generating a duct elevation profile which matches the terrain elevation profile.

The estimating can comprise generating a duct elevation profile by smoothing the terrain elevation profile.

The smoothing of the terrain elevation profile can be performed using a moving average.

The smoothing of the terrain elevation profile can be performed using a plurality of straight duct elements of one or more predetermined lengths.

The obtaining can comprise obtaining a series of terrain elevation data points forming the terrain elevation profile; and the estimating can comprise, for each of the series of terrain elevation data points, estimating a value of a corresponding duct elevation data point to form a series of duct elevation data points, wherein: for a first terrain elevation data point of the series of terrain elevation data points, corresponding to a first of the two ends of the route, estimating the value of the corresponding first duct elevation data point is performed by reducing a value of the first terrain elevation data point by a predetermined vertical offset value; and for each subsequent terrain elevation data point of the series of terrain elevation data points, estimating the value of the corresponding duct elevation data point comprises either: determining that the value of the terrain elevation data point is less than or equal to a predetermined threshold value different from the value of an immediately preceding terrain elevation data point of the series of terrain elevation data points and, responsive thereto, estimating the value of the corresponding duct elevation data point to be the same as the value of an immediately preceding duct elevation data point of the series of duct elevation data points; or determining that the terrain elevation data point is more than the predetermined threshold value different from the value of the immediately preceding terrain elevation data point of the series of terrain elevation data points and, responsive thereto, estimating the value of the corresponding duct elevation data point by reducing the value of the terrain elevation data point by the predetermined vertical offset value.

Obtaining the terrain elevation profile can comprise: obtaining route data comprising map coordinates of a plurality of points along the route; and obtaining elevation data for each of said plurality of points.

The computer-implemented method can further comprise, for each blockage risk location, determining a blockage risk score based on one or more of: when the duct is an existing duct, historical blockage data for the duct and/or a portion of the duct comprising that blockage risk location; when the duct is an existing duct, time elapsed since the duct was last confirmed clear of blockages; historical rainfall data for an area comprising one or both of the route ends; water table elevation data for one or both of the route ends, or a water table elevation profile for the route; when the duct is an existing duct, an indication of how much of an internal cross section of the duct is in use; or when the duct is a proposed duct, an indication of how much of an internal cross section of the duct is intended to be used initially; and for one or both of the route ends, data indicating one or more characteristics of a locality of the route end.

The computer-implemented method can further comprise: generating an overlay for a map of the route, the overlay comprising an indication of each blockage risk location; and causing a display device to display the overlay on the map of the route.

The indication of each blockage risk location can indicate its associated blockage risk score.

The computer-implemented method can further comprise, in response to predicting the one or more blockage risk locations, causing a user output device to raise a user alert.

According to a third aspect, there is provided a data processing apparatus comprising a processor configured to perform the method of the first aspect.

According to a fourth aspect, there is provided a computer-readable storage medium having stored thereon a computer program comprising instructions which, when the program is executed by a computer, cause the computer to carry out the method of the first aspect.

According to a fifth aspect, there is provided a data carrier signal carrying a computer program comprising instructions which, when the program is executed by a computer, cause the computer to carry out the method of the first aspect.

BRIEF DESCRIPTION OF THE FIGURES

Aspects of the present disclosure will now be described by way of example with reference to the accompanying figures. In the figures.

DETAILED DESCRIPTION OF THE FIGURES

The following description is presented to enable any person skilled in the art to make and use the system, and is provided in the context of a particular application. Various modifications to the disclosed embodiments will be readily apparent to those skilled in the art.

Methods and systems will now be described which can be used to predict blockage locations in underground ducts. The techniques described can be used in several different circumstances. When a blockage is known to exist somewhere along a duct, the blockage's approximate location along the duct route can be predicted so that it can be cleared more efficiently. When a duct network has been laid but no blockages have yet been found, locations which are at risk of becoming blocked can be predicted so that pre-emptive clearing can be carried out as part of routine network maintenance, or as a precursor to other scheduled work on a duct. In addition, when a new cable route is being planned, various routes can be modelled and locations on them at high risk of blockage can be predicted so that a route at a lower risk of blockage can be chosen. New ducts can be laid in a non-standard way to mitigate predicted blockage risks.

The present inventors have recognized that duct blockages are often caused by a build-up of silt introduced into the duct by water flowing into it from one or both of its ends, then settling in a part of the duct known as a sump.

Underground ducts are generally laid at a fixed depth below the surface, chosen to ensure there is enough earth above the duct to protect its contents from damage arising as a result of surface events such as a heavy goods vehicle driving over the duct route, while minimizing the effort required to lay and maintain the duct and its contents. For example, telecommunication ducts in the United Kingdom are generally laid at a depth of around 0.35 m. The elevation profile of the ducts therefore generally follows the terrain elevation profile, with each duct rising and falling with the land surface above it.

Since any water entering a duct from one of its ends will flow through the duct under gravity, the location of sumps—and thus likely blockage locations—can be determined by studying the duct's elevation profile. The present inventors have recognized that the terrain elevation profile can act as an approximate proxy for the duct elevation profile.

Figure 1:
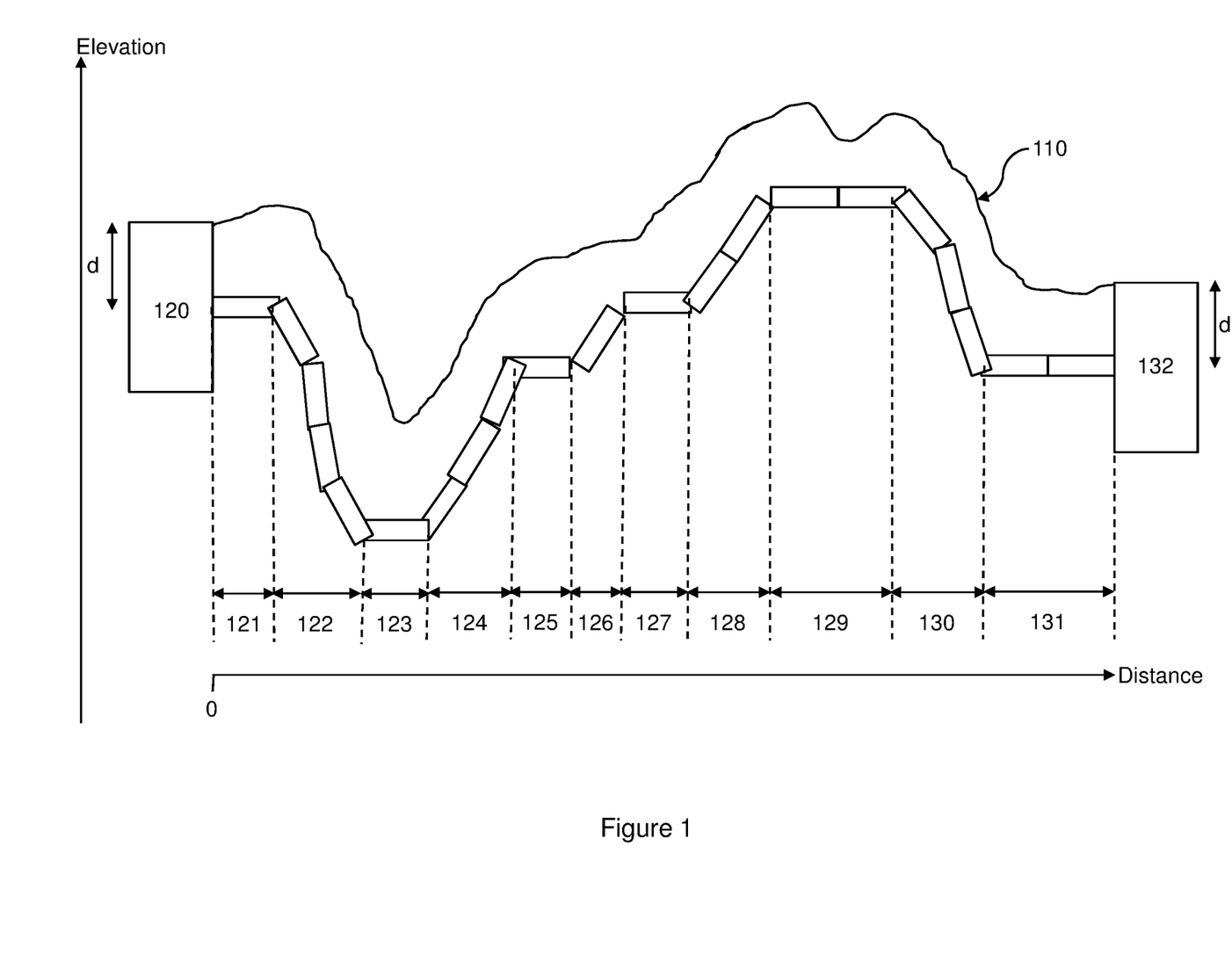
FIG. 1 is a schematic illustration of how an example duct can be laid.

FIG. 1 schematically illustrates how an example duct can be laid. The terrain elevation profile of the ground the duct is laid in is indicated at 110. The duct comprises a series of duct elements connecting a chamber 120 at a first end of the duct route to a chamber 132 at a second end of the duct route. Such chambers may for example have removable covers to allow laying, removal and maintenance operations on the duct to be carried out.

The duct is laid at a target depth of d below the surface to ensure it is adequately protected by overlying earth at all points along its route, without requiring more digging than is necessary to meet this criterion. As such, the duct elevation profile generally follows the terrain elevation profile, with a negative vertical offset of ~d.

The duct elements are shown schematically as straight tubes of a single fixed length. In reality, duct elements are provided in various forms, most commonly straight plastic tubes of substantially circular cross section and a small number of standard lengths, e.g. 1.5 m, 3 m and 6 m. When these duct elements are laid they are connected end-to-end so that cables can be run continuously through them. They generally accommodate a small amount of flex to allow connections to be made between elements laid at angles to one another. Some duct elements may also be cut down to non-standard lengths as part of the laying operation.

FIG. 1 shows some quite extreme variations in duct element gradients for illustrative purposes; generally duct element gradients will vary in a gentler manner. The duct can be considered as a series of duct portions 121 to 131, with each duct portion consisting of one or more duct elements in series, all duct elements forming any given duct portion either being laid substantially horizontally, with a positive gradient or with a negative gradient. Following the duct route along from the first chamber 120 to the second chamber 132: a first duct portion 121 is flat and consists of a single duct element; a second duct portion 122 slopes downwards and consists of four duct elements; a third duct portion 123 is flat and consists of a single duct element; a fourth duct portion 124 slopes upwards and consists of three duct elements; a fifth duct portion 125 is flat and consists of a single duct element; a sixth duct portion 126 slopes upwards and consists of a single duct element; a seventh duct portion 127 is flat and consists of a single duct element; an eighth duct portion 128 slopes upwards and consists of two duct elements; a ninth duct portion 129 is flat and consists of two duct elements; a tenth duct portion 130 slopes downwards and consists of three duct elements and an eleventh duct portion 131 is flat and consists of two duct elements.

It can be seen that, in the example of FIG. 1, water entering the duct from the first chamber 120 will tend to settle in the third duct portion 123, depending on volume possibly extending up the sides of the well that it forms with its adjacent duct portions 122 and 124. Silt is therefore likely to build up in the second to fourth duct portions 122 to 124, so a blockage could be predicted in that region of the duct. Similarly, water entering the duct from the second chamber 132 will tend to accumulate in the eleventh duct portion 131, since the upward slope of the tenth duct portion 130 relative to it will tend to prevent the water from flowing any further towards the first chamber 120. Thus, another blockage could be predicted in the region of the tenth and eleventh duct portions 130 and 131. There may be some instances, for example if the land around the second chamber 132 is flooded, in which the water pressure may be high enough to cause water from the second chamber 132 to flow up the tenth duct portion 130, over the flat ninth duct portion 129 and down the eighth to fourth duct portions 128 to 124 to settle in the well formed by the second to fourth duct portions 122 to 124, again indicating a possible blockage location there.

In reality, duct elements are laid horizontally wherever possible, especially elements adjacent chambers. This constraint, and the modular, relatively rigid, nature of the duct mean that although the duct elevation profile generally follows the terrain elevation profile, the duct elevation profile smooths out minor variations in the terrain elevation profile. In the example of FIG. 1 this can be seen where the ninth duct portion 129 is entirely flat over a part of the route where the terrain elevation profile indicates a trough between two humps. This illustrates how, though the terrain elevation profile can provide a first order approximation to the duct elevation profile, it may not always be sufficient to predict blockage locations.

FIGS. 2A to 2D schematically illustrate various arrangements of duct portions which can lead to water settling, and thus blockages. As in FIG. 1, the angles between duct portions depicted are extreme for illustrative purposes; in reality, duct elevation profiles tend to be much smoother.

Figure 2A:
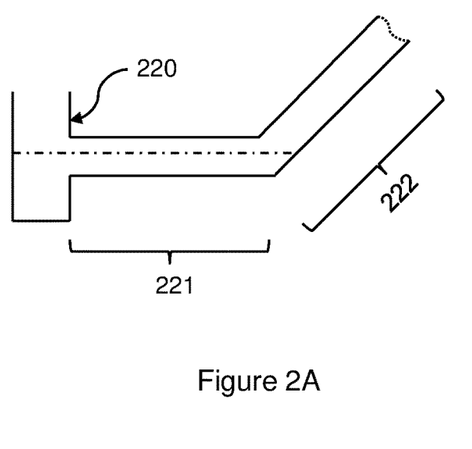
FIGS. 2A, 2B, 2C and 2D are schematic illustrations of arrangements of duct portions which can lead to water settling.

FIG. 2A shows a chamber 220 adjacent a flat duct portion 221, which leads to a rising duct portion 222. An example dot-dash water line is shown to illustrate how this duct elevation profile could trap water. This applies to either end of a duct; i.e. the same problem would be encountered if the chamber 220 were drawn to the right, with the horizontal duct portion 221 connecting it to a further duct portion 222 sloping up to the left. That configuration is shown in FIG. 1, where the tenth duct portion 130 slopes down to the eleventh duct portion 131 which runs flat into the second chamber 132.

Figure 2B:
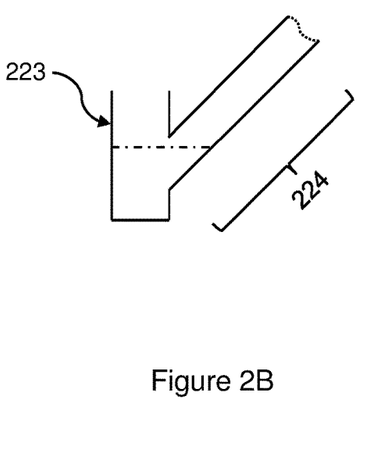

FIG. 2B shows a chamber 223 adjacent a rising duct portion 224. This configuration is unlikely to occur in reality since ducts adjacent chambers are laid horizontally wherever possible, but a water level is again shown to illustrate how such a configuration could lead to blockages. As with FIG. 2A, this applies to either end of a duct; the same problem would be encountered if the chamber 223 were drawn on the right with the adjacent duct portion 224 sloping up to the left from it.

Figure 2C:
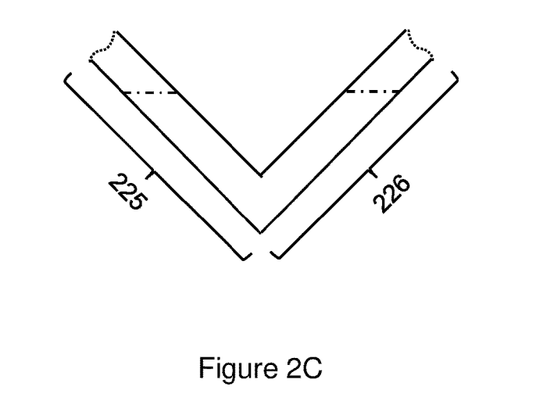

FIG. 2C shows two adjacent duct portions 225 and 226 having gradients of opposite sign meeting to form a v-shaped two-sided well. The duct portions 225 and 226 could connect in turn to other duct portions, or to chambers. Any water flowing down one of the duct portions will then be trapped at the bottom of the well due to the subsequent upward rise of the other, as illustrated by the example water level line. This configuration is not present in FIG. 1, but could have been formed by the two duct elements making up the ninth duct portion 129 if those duct elements had been laid to more closely follow the terrain above them.

Figure 2D:
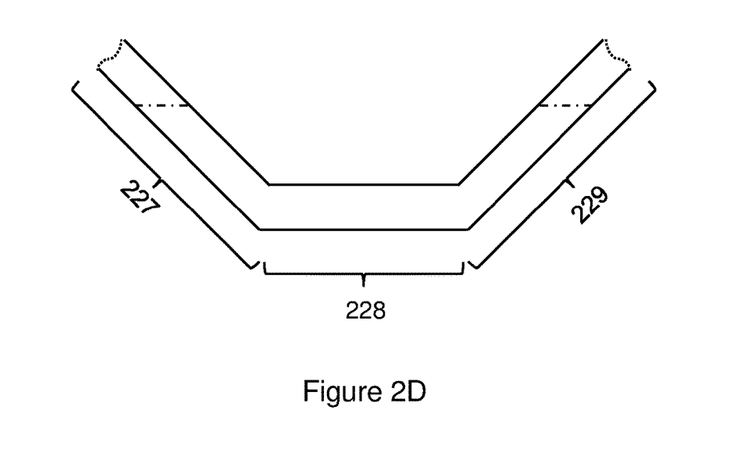

Finally, FIG. 2D illustrates a u-shaped three-sided well, where two duct portions 227 and 229 having gradients of opposite signs connected between their lowest points by a flat duct portion 228. Any water flowing down either of the sloping duct portions 227 or 229 will settle on the flat duct portion 228, resulting in a blockage risk. This configuration is shown in FIG. 1, where the second duct portion 122 slopes down to the flat third duct portion 123 adjacent the rising fourth duct portion 124.

FIGS. 2A to 2D show schematic illustrations of duct portions. As explained above in relation to FIG. 1 each duct portion can consist of one or more concatenated substantially straight duct elements, which in reality may be joined together in such a way that they exhibit a degree of radial flex. This level of detail is omitted from FIGS. 2A to 2D to avoid obscuring their illustration of the principles set out above. The duct portions of FIGS. 2A to 2D are shown in cross section to allow the location of an example water line to be indicated so that the way in which a silt blockage may build up within a duct portion can be envisaged. However, in some algorithms for predicting blockage locations discussed below, a linear duct elevation profile is considered as being split into concatenated duct portions, and thus a duct portion can be considered as a line, having no thickness, for the purposes of calculation.

Figure 2E:
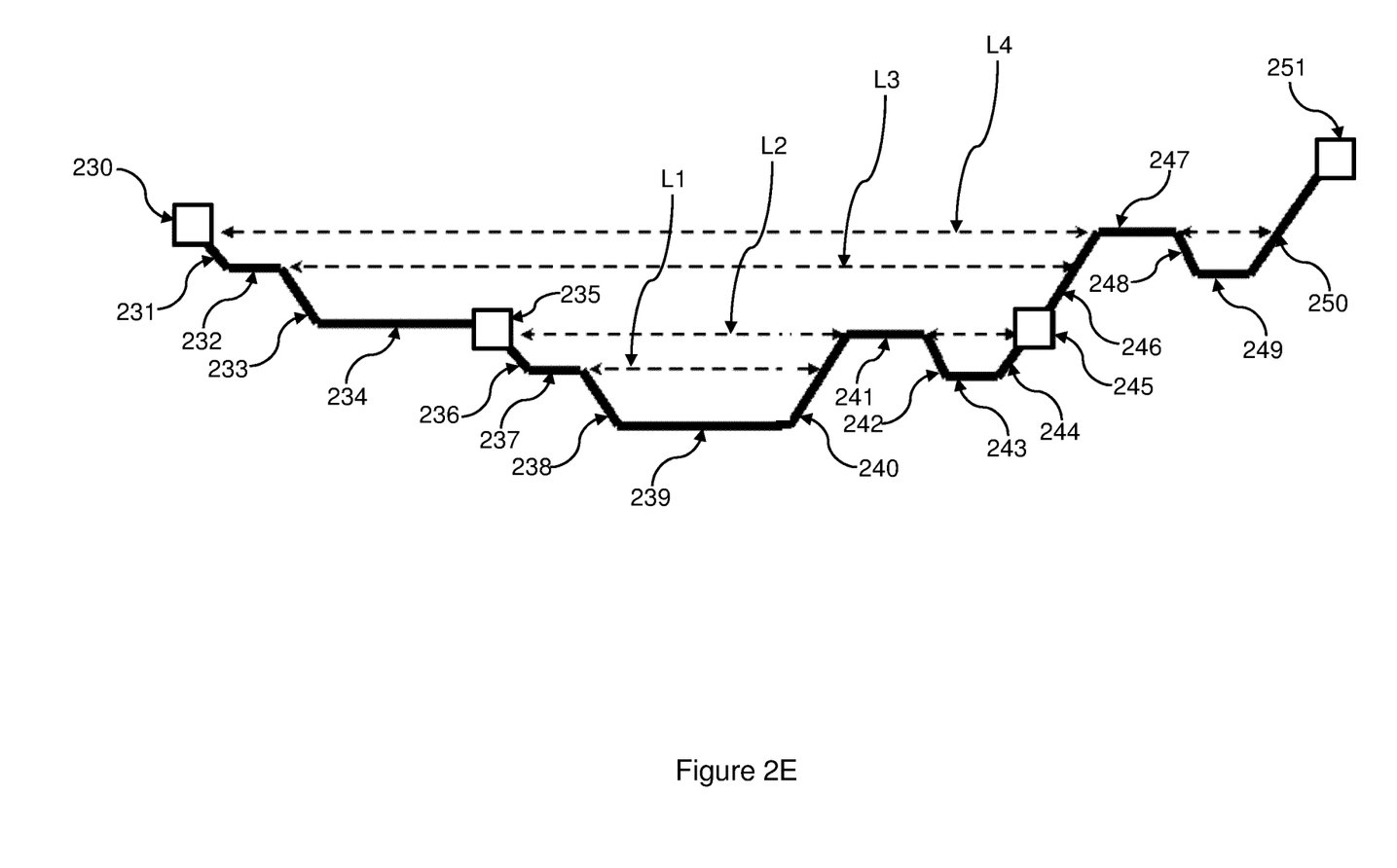
FIG. 2E schematically illustrates blockage vulnerabilities in a duct elevation profile.

FIG. 2E schematically illustrates blockage vulnerabilities in duct elevation profiles. In FIG. 2E squares indicate chambers and thick lines indicate duct portions. Duct portions 231 to 234 connect chambers 230 and 235. Duct portions 236 to 244 connect chambers 235 and 245. Duct portions 246 to 2504 connect chambers 245 and 251. Dashed lines are projected from duct portion ends to represent horizontal level lines L1 to L4.

A potential blockage location can be identified in duct portions 233 to 234 due to the presence of an arrangement of duct portions of the type shown in FIG. 2A. A potential blockage location can be identified in duct portion 246 due to the presence of an arrangement of duct portions of the type shown in FIG. 2B. Potential blockage locations can be identified in duct portions 238 to 240, 242 to 244 and 248 to 250 due to the presence of an arrangement of duct portions of the type shown in FIG. 2D.

The horizontal level lines L1 to L4 can be used to identify further potential blockage locations. For example, line L2 illustrates the top of a well formed by duct portions 236 to 240. It can be seen that, while a relatively small amount of rainfall could lead to a blockage in the three-sided well formed by duct portions 238 to 240 as identified above, a relatively large amount of rainfall could lead to a blockage anywhere in the well formed by duct portions 236 to 240. Similarly, line L3 illustrates the top of a yet larger well formed by the sequence of duct portions and chambers 233 to 246, so an even larger amount of rainfall could lead to a blockage anywhere in that well. (This last example illustrates how, for some terrains, for example valleys, routes encompassing multiple ducts may need to be taken into account to gain an accurate picture of where blockages could occur.)

Figure 3A:
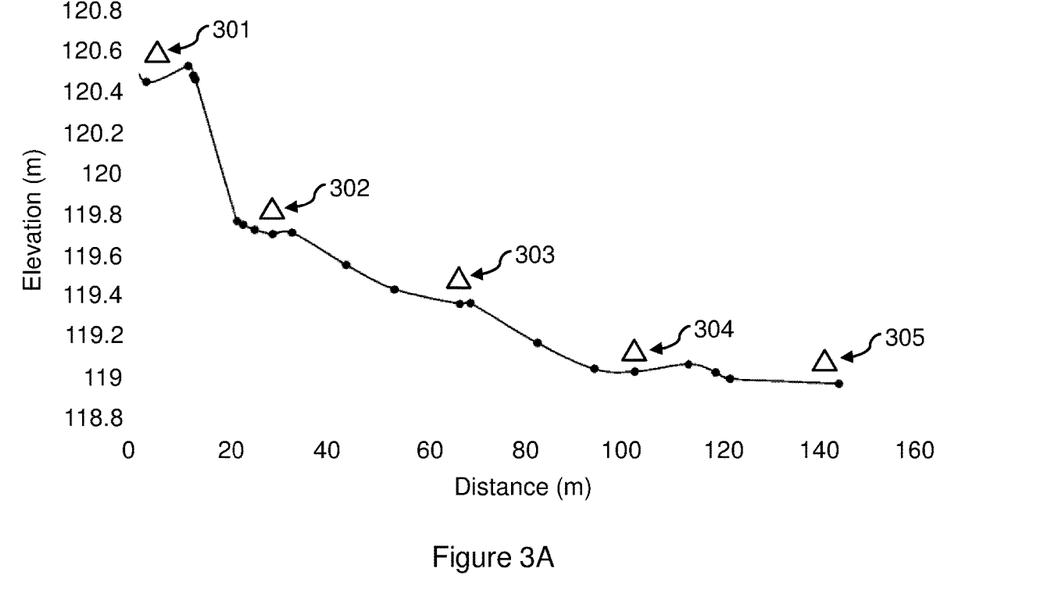
FIGS. 3A and 3B are graphs illustrating an example of how a duct elevation profile can be estimated from a terrain elevation profile.
Figure 3B:
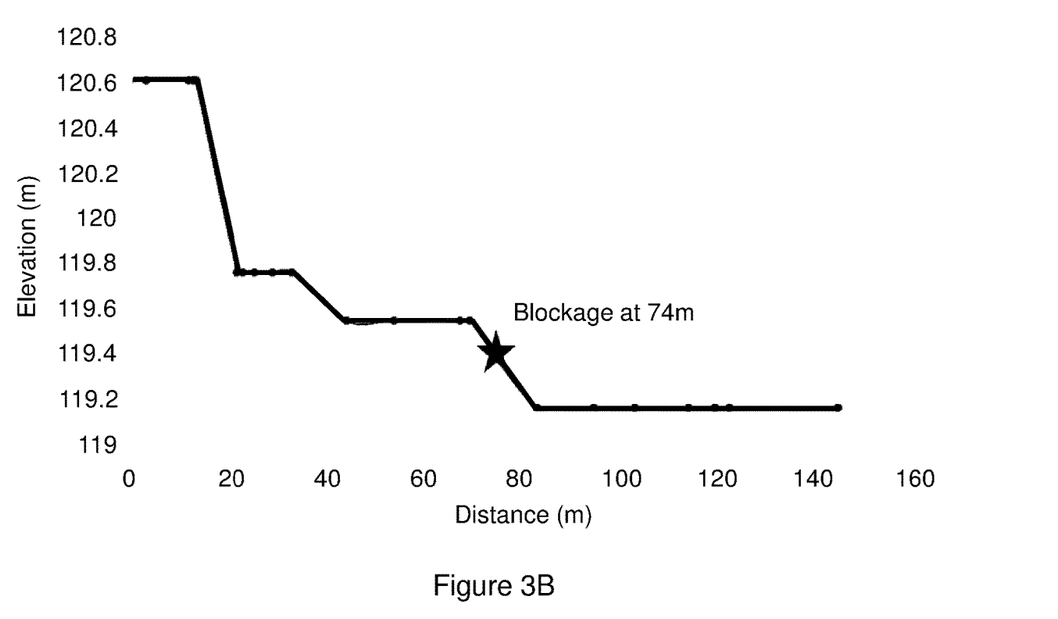

FIGS. 3A and 3B illustrate one example of how a duct elevation profile can be estimated from a terrain elevation profile in order to predict blockage locations. FIG. 3A is a real terrain elevation profile, showing the elevation of the terrain above a duct on the y-axis versus distance along the duct route on the x-axis, from a near end at 0 m to a far end at around 145 m. FIG. 3B illustrates an estimated duct elevation profile inferred from the terrain elevation profile of FIG. 3A by assuming that duct elements are laid horizontally where possible without deviating significantly from the requirement to lay duct elements at approximately consistent depths below the surface. In this example, the duct elevation profile is estimated to be horizontal between adjacent data points of the terrain elevation profile whose elevation values differ by less than 0.2 m. Thus, although the first four data points of the terrain elevation profile of FIG. 3A form a zig-zag pattern, since that zig-zag lies within an elevation band of less than the 0.2 m threshold the first four data points of the estimated duct elevation profile of FIG. 3B are all given the same elevation value.

Considering the terrain elevation profile of FIG. 3A, it might be assumed that blockages could form around the points labelled with triangles 301 to 305. The most likely location for water to settle on entering the duct from the near end would appear to be at triangle 301, around 10 m along the duct route, where there is a noticeable dip in the terrain elevation profile. This would suggest a duct configuration of the FIG. 2C or 2D types. Water settling may also be anticipated at triangle 305, at the far end of the duct route, since the terrain elevation profile rises from that end, suggesting a duct configuration of the FIG. 2B type. If rainfall were sufficient for water to overtop these locations (as in the flooding scenario described in relation to FIG. 1 above), then water could respectively settle in the shallow dips marked by triangles 302 and 304, at around 30 m and 105 m along the duct route respectively. Finally, with sufficient water ingress there may also be a chance of water settling in the shallow dip marked by triangle 303 around 70 m along the duct route.

Turning to FIG. 3B however, it can be seen that the only part of the estimated duct elevation profile which matches any of the configurations of FIGS. 2A to 2D is where the estimated duct elevation profile runs flat from the far end back to around 85 m along the duct route, then rises in the manner of FIG. 2A back to around 70 m along the duct route. A blockage could therefore be predicted somewhere between around 70 m along the duct route and its far end. In reality, a blockage was found in this duct at 74 m along the route, as marked by the star. This could not be predicted by studying the terrain elevation profile in detail as in the preceding paragraph, though a more broad brush assessment would have suggested that blockages are more likely towards the far end of the duct than the near end, by virtue of the low elevation of the far end with respect to the near end. Such an assessment would be sufficient to improve the efficiency of blockage clearance by suggesting that the clearing proceeds from the far end of the duct, not the near end.

From the analysis of FIGS. 3A and 3B above it can be seen that useful blockage location predictions can be made by considering the terrain elevation profile of the ground above a duct route, and that more accurate predictions can be made by taking into account constraints on the duct laying process when estimating the duct elevation profile.

The 0.2 m threshold used to arrive at the estimated duct elevation profile of FIG. 3B is only exemplary, a different threshold value could be used, for example 0.5 m or 1 m. Such a threshold value could for example be based on the flex tolerable by a standard linkage between two standard duct elements; i.e. how far one end of a standard duct element can be pulled radially from its equilibrium position before the elastic restoration force exceeds the maximum force tolerable by a standard duct linkage, or the duct element itself snaps, if that would occur at a lower flex. For a 6 m duct element for example, it has been found that the natural flex, i.e. the flex caused by the duct element's own weight when supported from one end only, is ~0.5 m, and additional force can be applied to induce a flex of ~1 m.

An optimal threshold value could be ascertained by testing the matching of blockage predictions made using a variety of threshold values against real blockage locations. The threshold could be refined on an on-going basis using an iterative process such as a machine learning algorithm.

Estimation of the duct elevation profile could take into account other constraints than the preference for horizontal laying considered to estimate the duct elevation profile of FIG. 3B. For example, one or more standard duct element lengths could be assumed. This constraint could optionally be combined with the horizontal laying constraint, and possibly others. An algorithm could be developed to estimate duct elevation profiles according to standardized duct laying conventions and/or conventions known to be common practice. Such an algorithm could be improved over time using machine learning techniques.

Figure 4:
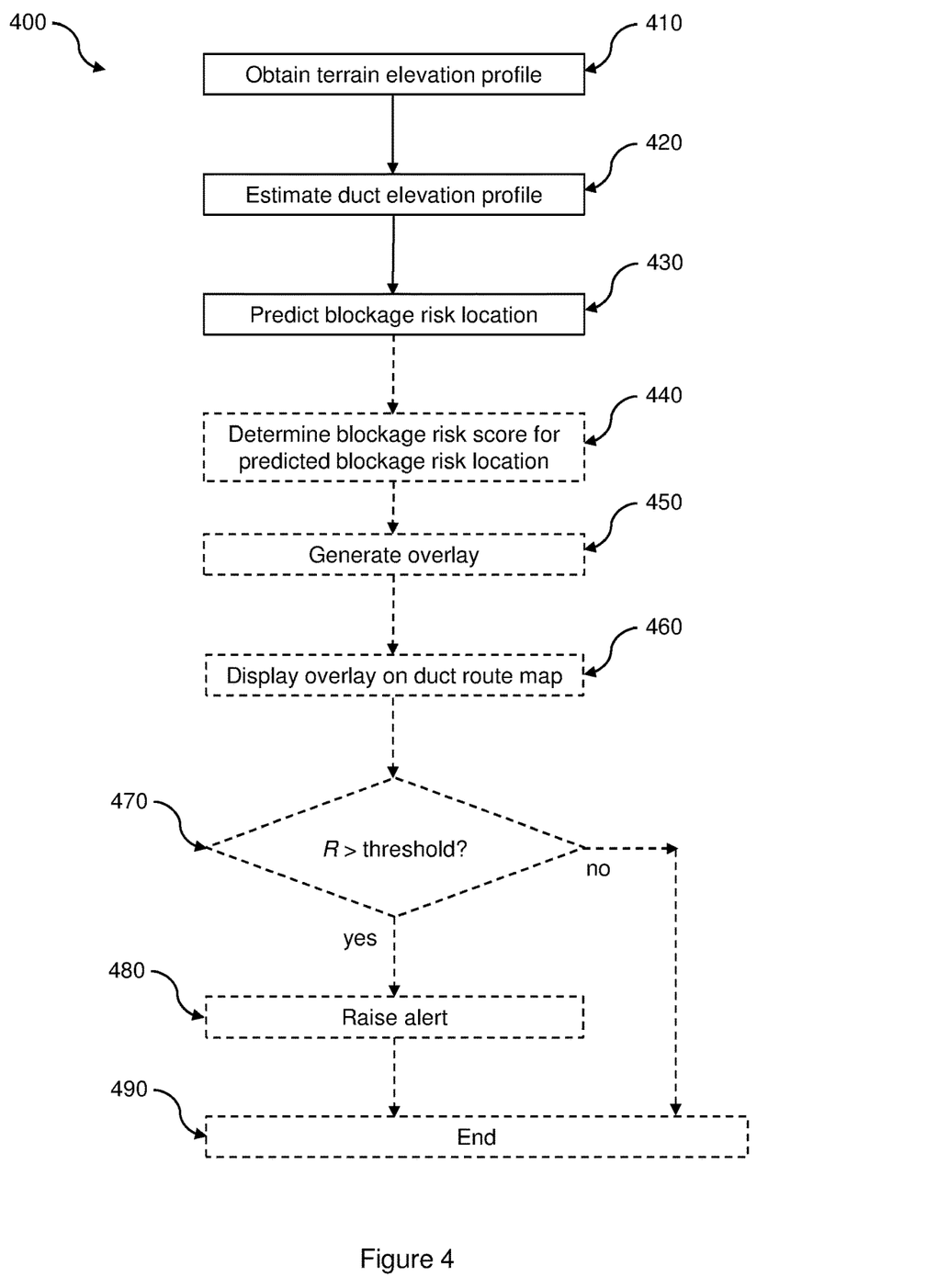
FIG. 4 is a flowchart illustrating an example method of predicting blockage risk locations.

FIG. 4 is a flowchart illustrating an example method 400 of predicting blockage risk locations along a route for an underground duct. At 410 a terrain elevation profile for the route is obtained. At 420 a duct elevation profile for the route is estimated based on the terrain elevation profile. At 430 one or more blockage risk locations along the route are predicted by determining where water entering the duct from each of the two ends would settle, based on the duct elevation profile.

Obtaining the terrain elevation profile at 410 can for example involve obtaining route data comprising map coordinates of a plurality of points along the route and obtaining elevation data for each of those points. This could for example be achieved by querying a geographic information system (GIS).

Estimation of the duct elevation profile at 420 can be achieved in a number of ways. It can for example involve generating a duct elevation profile which matches the terrain elevation profile, e.g. being a vertical translation of the terrain elevation profile downwards by a target duct depth. Alternatively or additionally, the estimation at 420 could involve smoothing the terrain elevation profile, for example using a moving average, linear regression or other statistical operation. Smoothing could involve modelling the duct as a series of straight duct elements of one or more predetermined lengths, for example of between 1 m and 10 m, e.g. 1.5 m, 3 m or 6 m.

The estimation at 420 could involve, for each of a series of terrain elevation data points obtained in 410, estimating a value of a corresponding duct elevation data point according to a set of rules intended to take into account typical duct laying behavior, such as laying at a particular target duct depth and a preference for horizontal laying. For example, for a first terrain elevation data point of the series of terrain elevation data points, corresponding to a first of the two ends of the route, the value of the corresponding first duct elevation data point could be estimated by reducing a value of the first terrain elevation data point by a predetermined vertical offset. For each subsequent terrain elevation data point, estimation of the corresponding duct elevation data point could involve determining whether the value of the terrain elevation data point is less than or equal to a predetermined threshold value different from the value of the immediately preceding terrain elevation data point of the series. If it is, then the value of the duct elevation data point can be taken to be the same as the value of the immediately preceding duct elevation data point of the series. Alternatively, if the terrain elevation data point is more than the predetermined threshold value different from the value of the immediately preceding terrain elevation data point of the series, then the value of the corresponding duct elevation data point can be estimated by reducing the value of the terrain elevation data point by the predetermined vertical offset.

The predetermined vertical offset could be zero (as in the example of this algorithm illustrated by FIG. 3B), since it is the variations in duct elevation along the route which are used to predict likely blockage locations. However more sophisticated predictions may be possible with a more accurate model where the predetermined vertical offset is for example a target duct depth (e.g. 0.35 m) and the predictive model also incorporates water table data, such as the water table elevation at one or both of the route ends, or a water table elevation profile for the route.

The predetermined threshold value could for example be between 0.1 m and 1 m, e.g. 0.5 m.

Estimation of the duct elevation profile could be performed according to an iterative algorithm which improves through use on successive data sets, such as a machine learning algorithm.

Prediction of a blockage location at 430 can also be done in a number of ways. A first order prediction could be made by identifying the lowest point in the duct elevation profile—its global minimum. A second order prediction could be made by identifying one or more depressions or wells in the duct elevation profile, for example by estimating a first derivative of the duct elevation profile, estimating a second derivative of any points on the duct elevation profile having an estimated first derivative of zero and identifying a depression at any of those points where the estimated second derivative is positive—i.e. local minima of a differentiable function approximating the duct elevation profile.

The prediction at 430 could alternatively or additionally involve splitting the duct elevation profile into a plurality of duct portions (like the duct portions 121 to 131 of FIG. 1), where for each duct portion the duct elevation profile's gradient over the entire duct portion is one of positive, negative or flat, in order to identify duct configurations corresponding to one of those illustrated by FIGS. 2A to 2D. A duct portion could be formed of a single duct element, of e.g. 1.5 m, 3 m or 6 m, or multiple duct elements arranged end-to-end and either all sloping up—whether at the same or varying angles, all sloping down—whether at the same or varying angles, or all horizontal. A blockage location could be predicted in a first duct portion if it extends between one of the two ends of the route and a second duct portion, the duct elevation profile being lower over at least a part of the first duct portion than over at least a part of the second duct portion, as in the configurations of FIGS. 2A, 2B and a terminal arrangement of FIG. 2C. A blockage location could also be predicted in any duct portion which forms a side of a two-sided well consisting of that duct portion and another duct portion extending from its lowest point and having a gradient of opposite sign to it, as in the configuration of FIG. 2C. In addition, a blockage location could be predicted in any duct portion which forms a side of a three-sided well consisting of a flat duct portion extending between lower ends of a duct portion having a negative gradient and a duct portion having a positive gradient, as in the configuration of FIG. 2D.

Prediction of blockage locations and/or calculation of risk scores could be performed according to an iterative algorithm which improves through use on successive data sets, such as a machine learning algorithm. For example, data from ducts where blockage locations are known and a duct elevation profile has been estimated can be input as training data to a supervised learning algorithm.

Following prediction of blockage locations at 430, a blockage risk score could be determined for each at optional 440. This could be done according to an algorithm which takes into account one or more factors. When the duct is an existing duct, historical blockage data for the duct and/or a portion of the duct comprising the blockage risk location can be considered. How much time has passed since the duct was last confirmed clear of blockages can alternatively or additionally be taken into account. Whether the duct already exists, or is only planned, historical rainfall data for an area comprising one or both of the route ends can be considered, and/or water table elevation data for one or both of the route ends, or a water table elevation profile for the entire route or a part of it. A measure of free space in the duct may alternatively or additionally be taken into account, for example the proportion of the duct's internal cross section that is (or is intended to be) taken up by cables, or the number of cables the duct (is intended to) accommodate(s). Other possible considerations include characteristics of the route end locations, for example chamber type, surface material (e.g. concrete, tarmac, turf, packed earth), chamber wall material, soil type, surface topography around the chamber etc.

An example blockage risk score equation may for example be:

$$R = w_S \cdot S + w_B \cdot B + w_F \cdot F + w_C \cdot C \quad (1)$$

where:

R is the blockage risk score;

$w_X$ is a weighting factor for parameter X, which can for example be determined theoretically, analytically from a statistical model or through an iterative method such as a machine learning technique;

S is a duct space score, which could for example be a function of the percentage of the duct's internal cross section not taken up by cables, e.g. with the function being proportional to the duct's internal cross-section;

B is a historical blockage score, which could for example correspond to the number of blockages in the preceding two years;

F is a rainfall score, which could for example be determined from rainfall data for the preceding two years as follows:

TABLE 1

| Total rainfall in last 2 years | F |
|---|---|
| 0-800 mm | 0 |
| 801-1600 mm | 1 |
| 1601-2400 mm | 2 |
| >2400 mm | 3 |

C is a chamber type score, for example based on the level of water ingress typically found in chambers in particular settings, e.g.:

TABLE 2

| Chamber setting | C |
|---|---|
| Concrete | 0 |
| Asphalt | 1 |
| Paving | 2 |
| Turf/earth | 3 |

Further options in method 400 are to generate an overlay for a map of the route at 450 to indicate the identified blockage risk locations when the overlay is displayed on the map at 460. If blockage risk scores have been determined, then they could also be indicated on the overlay, for example using numerals or color coding.

If a blockage risk score has been calculated then at 470 this can be compared to a threshold value and, if the risk score exceeds the threshold value, a user alert can be raised at 480. The alert could be raised by means of a user output device such as a monitor, a warning light or a buzzer. Alternatively, the alert could be in the form of a workflow trigger. For example, if the blockage prediction algorithm is being run as a precursor of a cable installation workflow for an existing duct then if the duct is identified as having one or more high risk predicted blockage locations then a duct check and clear workflow could be triggered which must be completed before the cable installation workflow can resume. The duct check and clear workflow could comprise communicating the high risk predicted blockage locations to the clearing team, for example by providing them with documentation including an overlaid map of the duct route as described above.

The process 400 ends at 490.

Figure 5:
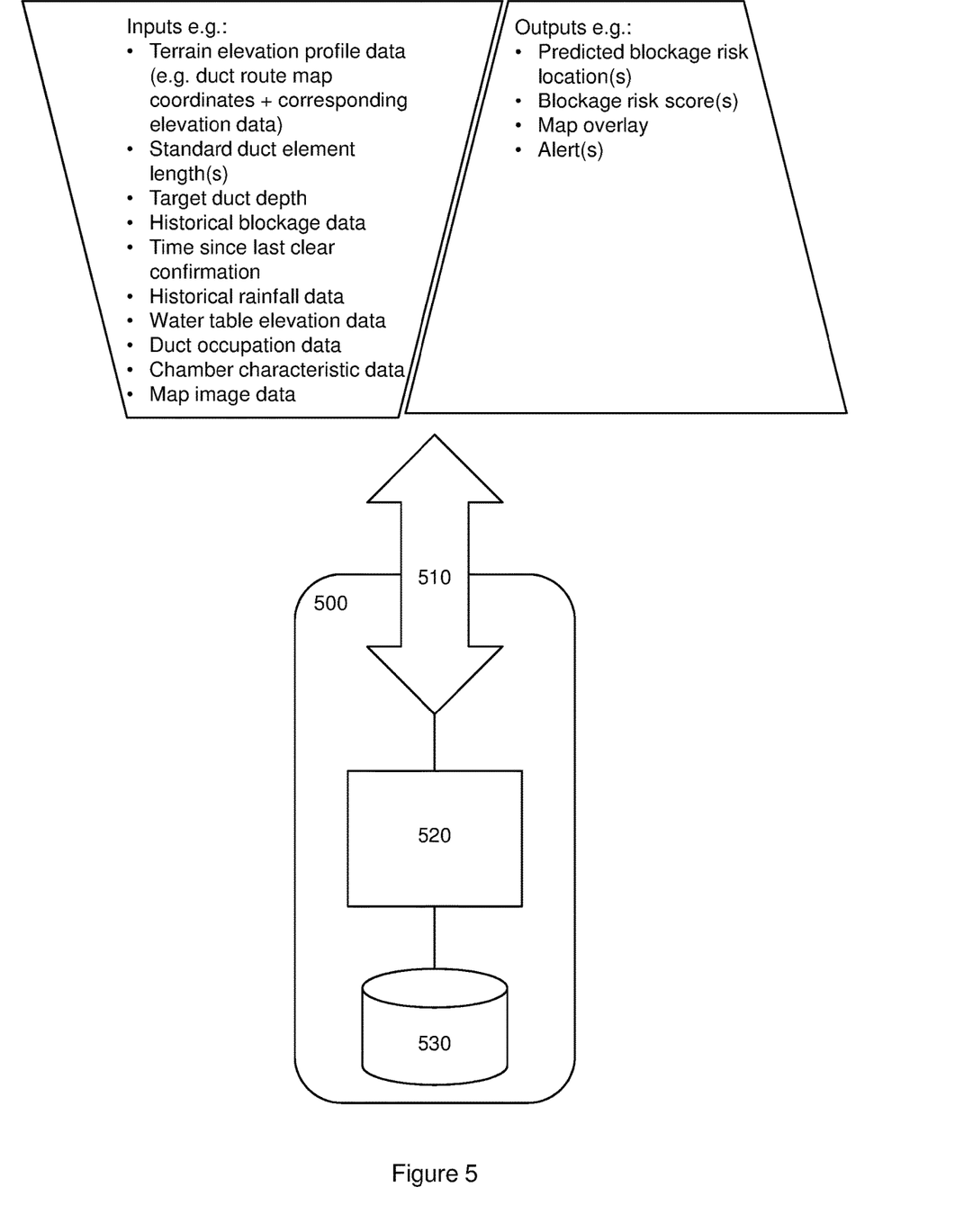
FIG. 5 is a schematic illustration of a data processing apparatus.

FIG. 5 schematically illustrates a data processing apparatus 500 which could be used to perform the methods described above. It comprises an input/output interface 510 in communication with a processor 520, which is also in communication with a memory 530.

Inputs to the processor 520 can come from the memory 530 or the interface 510 and can include one or more of: a terrain elevation profile, for example in the form of duct route map coordinates with corresponding elevation data; one or more standard duct element lengths; a target duct depth; historical duct blockage data; the time since the last duct clear confirmation; historical rainfall data; water table elevation data; duct occupation data; chamber characteristic data; and map image data.

Outputs from the processor can include one or more of: one or more predicted blockage locations; one or more blockage risk scores; map overlay data; and one or more alert initiation signals.

Other embodiments will be apparent to those skilled in the art from consideration of the specification and practice of the embodiments disclosed herein. It is intended that the specification and examples be considered as exemplary only.

In addition, where this application has listed the operations of a method or procedure in a specific order, it could be possible, or even expedient in certain circumstances, to change the order in which some are performed, and it is intended that the particular operations of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

User devices can include, without limitation, static user devices such as PCs and mobile user devices such as smartphones, tablets, laptops and smartwatches.

Receivers and transmitters as described herein may be standalone or may be comprised in transceivers. A communication link as described herein comprises at least one transmitter capable of transmitting data to at least one receiver over one or more wired or wireless communication channels. Wired communication channels can be arranged for electrical or optical transmission. Such a communication link can optionally further comprise one or more relaying transceivers.

User input devices can include, without limitation, microphones, buttons, keypads, touchscreens, touchpads, trackballs, joysticks and mice. User output devices can include, without limitation, speakers, buzzers, display screens, projectors, indicator lights, haptic feedback devices and refreshable braille displays. User interface devices can comprise one or more user input devices, one or more user output devices, or both.

The invention claimed is:

1. A computer-implemented method of identifying one or more locations along a route for an underground duct which indicate a blockage risk, the route extending between two ends, the method comprising:
   obtaining a terrain elevation profile for the route;
   estimating a duct elevation profile for the route based on the terrain elevation profile;
   predicting one or more blockage risk locations along the route by determining where water entering the underground duct from each of the two ends would settle, based on the duct elevation profile, by:
      splitting the duct elevation profile into a plurality of duct portions, wherein for each duct portion a gradient of the duct elevation profile over the entire duct portion is one of positive, negative or flat; and
      predicting a blockage risk location in a first duct portion when at least one of the following conditions is determined to be true for the first duct portion:
         the first duct portion extends between one of the two ends of the route and a second duct portion, the duct elevation profile being lower over at least a part of the first duct portion than over at least a part of the second duct portion,
         the first duct portion is a side of a two-sided well consisting of the first duct portion and a second duct portion extending from a lowest point of the first duct portion and having a gradient of opposite sign to the first duct portion, and
         the first duct portion is a side of a three-sided well consisting of a flat duct portion extending between lower ends of a duct portion having a negative gradient and a duct portion having a positive gradient;
   the method further comprising at least one of:
      generating an overlay for a map of the route, the overlay comprising an indication of each blockage risk location, then causing a display device to display the overlay on the map of the route; or
      in response to predicting the one or more blockage risk locations, causing a user output device to raise a user alert.

2. A computer-implemented method of identifying one or more locations along a route for an underground duct which indicate a blockage risk, the route extending between two ends, the method comprising:
   obtaining a terrain elevation profile for the route;
   estimating a duct elevation profile for the route based on the terrain elevation profile; and
   predicting one or more blockage risk locations along the route by determining where water entering the underground duct from each of the two ends would settle, based on the duct elevation profile.

3. The computer-implemented method of claim 2, wherein the predicting comprises identifying a lowest point in the duct elevation profile and predicting a blockage risk location within a portion of the route comprising the identified lowest point.

4. The computer-implemented method of claim 2, wherein the predicting comprises identifying a depression in the duct elevation profile and predicting a blockage risk location within a portion of the route comprising the identified depression.

5. The computer-implemented method of claim 4, wherein the predicting comprises:
   estimating a first derivative of the duct elevation profile;
   estimating a second derivative of a point on the duct elevation profile having an estimated first derivative of zero; and
   identifying the depression at the point when the estimated second derivative is positive.

6. The computer-implemented method of claim 2, wherein the predicting comprises splitting the duct elevation profile into a plurality of duct portions, wherein for each duct portion a gradient of the duct elevation profile over the entire duct portion is one of positive, negative or flat.

7. The computer-implemented method of claim 6, wherein the predicting further comprises predicting a blockage risk location in a first duct portion when at least one of the following conditions is determined to be true for the first duct portion:

the first duct portion extends between one of the two ends of the route and a second duct portion, the duct elevation profile being lower over at least a part of the first duct portion than over at least a part of the second duct portion, the first duct portion is a side of a two-sided well consisting of the first duct portion and a second duct portion extending from a lowest point of the first duct portion and having a gradient of opposite sign to the first duct portion, the first duct portion is a side of a three-sided well consisting of a flat duct portion extending between lower ends of a duct portion having a negative gradient and a duct portion having a positive gradient, and the first duct portion is comprised in a well consisting of a concatenated series of duct portions starting with a proximal duct portion and ending with a distal duct portion, over which the duct elevation profile always remains lower than the lower of:
  a highest value for the proximal duct portion, and
  a highest value for the distal duct portion.

8. The computer-implemented method of claim 2, wherein the estimating comprises generating a duct elevation profile which matches the terrain elevation profile.

9. The computer-implemented method of claim 2, wherein the estimating comprises generating a duct elevation profile by smoothing the terrain elevation profile.

10. The computer-implemented method of claim 9, wherein the smoothing of the terrain elevation profile is performed using a moving average.

11. The computer-implemented method of claim 9, wherein the smoothing of the terrain elevation profile is performed using a plurality of straight duct elements of one or more predetermined lengths.

12. The computer-implemented method of claim 2, wherein:

the obtaining comprises obtaining a series of terrain elevation data points forming the terrain elevation profile; and the estimating comprises, for each of the series of terrain elevation data points, estimating a value of a corresponding duct elevation data point to form a series of duct elevation data points, wherein:

for a first terrain elevation data point of the series of terrain elevation data points, corresponding to a first end of the two ends of the route, estimating the value of the corresponding first duct elevation data point is performed by reducing a value of the first terrain elevation data point by a predetermined vertical offset value; and for each subsequent terrain elevation data point of the series of terrain elevation data points, estimating the value of the corresponding duct elevation data point comprises either:

determining that the value of the terrain elevation data point is less than or equal to a predetermined threshold value different from the value of an immediately preceding terrain elevation data point of the series of terrain elevation data points and, responsive thereto, estimating the value of the corresponding duct elevation data point to be the same as the value of an immediately preceding duct elevation data point of the series of duct elevation data points; or determining that the terrain elevation data point is more than the predetermined threshold value different from the value of the immediately preceding terrain elevation data point of the series of terrain elevation data points and, responsive thereto, estimating the value of the corresponding duct elevation data point by reducing the value of the terrain elevation data point by the predetermined vertical offset value.

13. The computer-implemented method of claim 2, wherein obtaining the terrain elevation profile comprises:
obtaining route data comprising map coordinates of a plurality of points along the route; and
obtaining elevation data for each of the plurality of points.

14. The computer-implemented method of claim 2, further comprising, for each blockage risk location, determining a blockage risk score based on one or more of:

when the underground duct is an existing duct, at least one of historical blockage data for the underground duct or a portion of the underground duct comprising the respective blockage risk location;

when the underground duct is an existing duct, time elapsed since the underground duct was last confirmed clear of blockages;

historical rainfall data for an area comprising one or both of the route ends;

water table elevation data for one or both of the route ends, or a water table elevation profile for the route;

when the underground duct is an existing duct, an indication of how much of an internal cross section of the underground duct is in use; or when the underground duct is a proposed duct, an indication of how much of an internal cross section of the underground duct is intended to be used initially; and for one or both of the route ends, data indicating one or more characteristics of a locality of the route end.

15. The computer-implemented method of claim 14, further comprising:
generating an overlay for a map of the route, the overlay comprising an indication of each blockage risk location; and
causing a display device to display the overlay on the map of the route.

16. The computer-implemented method of claim 15, wherein the indication of each blockage risk location indicates an associated blockage risk score.

17. The computer-implemented method of claim 2, further comprising, in response to predicting the one or more blockage risk locations, causing a user output device to raise a user alert.

18. A system comprising a processor and memory configured to perform the method of claim 2.

19. A non-transitory computer-readable storage medium having stored thereon a computer program comprising instructions which, when the computer program is executed by a computer, cause the computer to carry out the method of claim 2.

* * * * *